Sept. 22, 1931.    R. G. ANDERSON    1,824,648
RESILIENT GEAR
Filed June 18, 1930

Inventor:
Robert G. Anderson,
by Charles E. Tullar
His Attorney.

Patented Sept. 22, 1931

1,824,648

UNITED STATES PATENT OFFICE

ROBERT G. ANDERSON, OF HARBORCREEK, PENNSYLVANIA, ASSIGNOR TO GENERAL ELECTRIC COMPANY, A CORPORATION OF NEW YORK

RESILIENT GEAR

Application filed June 18, 1930. Serial No. 462,113.

My invention relates to resilient gear wheels and has for its object the provision of a simple and rugged gear of this kind in which the rim of the gear is resiliently maintained coaxially with the axis of the shaft on which it is mounted to prevent undue concentration of stresses on the gear teeth and to take up any shocks to which the gear may be subjected.

I accomplish this by providing a gear comprising a hub, a toothed rim, and an arrangement including a pin substantially parallel to the axis of the gear for resiliently connecting the rim and hub.

Figure 1:
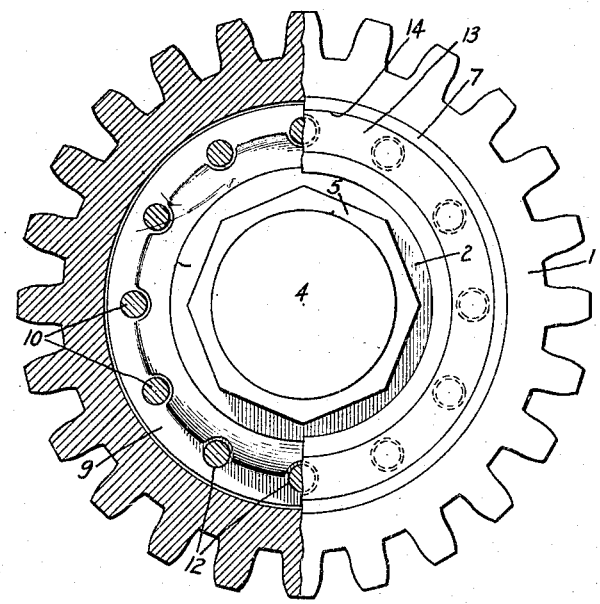
Figure 2:
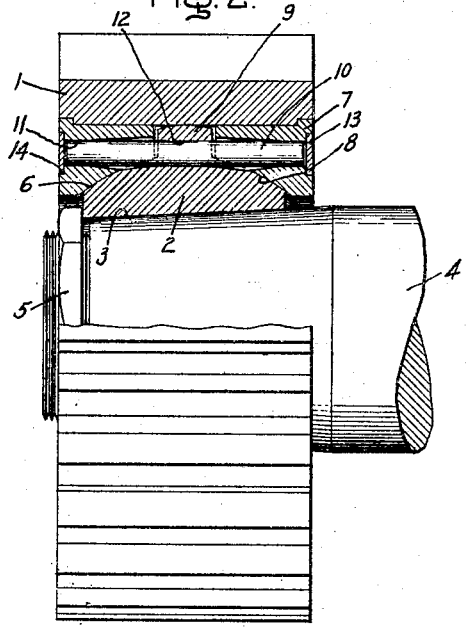

My invention will be better understood by a reference to the following detailed description thereof taken in connection with the accompanying drawings, in which Fig. 1 is an end elevation of a gear partly broken away, and Fig. 2 is a side elevation of a gear partly broken away to more clearly show the construction.

Referring to the drawings, I have shown a gear embodying my invention comprising a toothed rim 1 which is mounted on a hub 2 secured to a tapered portion 3 of a shaft 4 by a nut 5. The rim 1 is universally mounted on the hub 2 and connected thereto in such manner as to resiliently maintain the rim coaxial with the gear shaft to take up any shocks to which the gear may be subjected, and to prevent undue concentration of stress on the gear teeth. In order to universally mount the rim on the hub annular spherically curved faces 6 are provided on the hub having a common center on the axis of the shaft, and rings 7 are pressed into the gear rim, the rings having spherically curved faces 8 fitting the faces on the hub. By this arrangement the gear rim is rigidly supported against radial movement with respect to the hub so that its pitch circle remains substantially tangent to the pitch circle of the cooperating gear. The hub has an annular flange 9 between the spherically curved faces thereof so that the flange extends between the rings pressed into the gear rim, and pins 10 are arranged in openings 11 and 12 formed in the rings and flange respectively, and thereby providing a resilient connection between the rim and the hub. Although the pins in this embodiment are shown as cylindrical they may be of any desired shape, it being understood that the openings 11 and 12 would be made to fit the pins. The pins 10 are tightly fitted in the hub flange and slidingly fitted in the outer ends of openings in the rings 7 which openings taper to an increasing diameter from the outer ends of the pins toward the hub flange. The pins 10 are preferably retained in place by annular plates 13 pressed into recesses 14 in the rings 7.

In this way a tortional resilient connection is provided between the hub and rim of the gear as the ends of the pins engage the rings secured to the gear and the intermediate portions of the pins extend through openings in the hub flange. The pins are therefore subjected to bending and give the gear the desired torsional flexibility so that a load can be gradually transferred from the rim to the hub and shocks absorbed. In this construction when the pins are deflected under load they come in contact with the tapering openings in the ring so that their resistance to bending is increased as they are deflected. This construction has the desired advantage that undue concentration of stresses on the gear teeth is avoided because the gear rim can, upon deflecting the pins, turn with respect to the hub on which it is mounted and align itself with the corresponding gear and thereby bring the entire length of the gear teeth in contact with the teeth of the cooperating gear.

While I have herein illustrated and described a certain embodiment of my invention, I desire it to be understood that I do not intend to be limited thereto and I intend to cover all modifications within the spirit and scope of my invention.

What I claim as new and desire to secure by Letters Patent of the United States, is:

1. A gear comprising a hub, a separate toothed rim, and a resilient pin substantially parallel to the axis of the gear connecting said hub and rim.

2. A gear comprising a hub having openings therein, a toothed rim having openings therein, and means including a pin arranged in the openings in said hub and rim substantially parallel to the axis of the gear for resiliently connecting said hub and rim and for providing universal movement of the hub relative to the rim so as to obtain evenly distributed pressure on the teeth of the gear.

3. A gear comprising a hub having openings therein, a toothed rim having openings therein, the openings in said rim being tapered, and means including a pin arranged in the openings in the hub and rim substantially parallel to the axis of the gear resiliently joining said hub and rim, so as to gradually transfer and absorb any shock to which the gear is subjected.

4. A gear comprising a hub having annular spherical faces, a toothed rim having annular spherical rings corresponding to and fitting the spherical faces of said hub, and means including a pin substantially parallel to the axis of the gear for resiliently connecting said hub and rim and for providing universal movement of the hub relative to the rim so as to obtain evenly distributed pressure on the teeth of said gear.

5. A gear comprising a hub provided with an annular flange thereon having openings therethrough, a toothed rim provided with rings therein having openings therein aligned with the openings in said flange, and means including a pin arranged in the openings in said flange and rings substantially parallel to the axis of the gear for resiliently connecting said hub and rim and for providing universal movement of the hub relative to the rim so as to obtain evenly distributed pressure on the teeth of said gear.

6. A gear comprising a hub provided with an annular flange thereon, said flange having openings therethrough, a toothed rim provided with rings therein, said rings having tapered openings therein, and means including a pin arranged in the openings in said flange and rings substantially parallel to the axis of the gear for resiliently connecting said hub and rim and for providing universal movement of the hub relative to the rim so as to obtain evenly distributed pressure on the teeth of said gear.

7. A gear comprising a hub provided with annular spherically curved faces having a flange thereon, said flange having a plurality of openings therein, a toothed rim provided with a spherical face having a plurality of openings therein aligned with the openings in said flange, the spherical face on said hub fitting the spherical face on said rim, and means including a pin arranged in the openings in the hub and rim substantially parallel to the axes of the gear for resiliently connecting said hub and rim and for providing universal movement of the hub relative to the rim so as to obtain evenly distributed pressures on the teeth of said gear.

8. A gear comprising a hub provided with annular spherically curved faces and having a flange thereon provided with a plurality of openings therein, a toothed rim having a spherical face fitting the spherical face in said hub and provided with a plurality of openings therein, the openings in said rim being tapered, and a means including a pin arranged in the openings in the hub and rim substantially parallel to the axis of the gear for resiliently connecting said hub and rim and for providing universal movement of the hub relative to the rim so as to obtain evenly distributed pressure on the teeth of said gear.

In witness whereof, I have hereto set my hand this 16 day of June, 1930.

ROBERT G. ANDERSON.